United States Patent

McIlroy, II

[15] 3,670,369

[45] June 20, 1972

[54] ADJUSTABLE CLAMP FOR ELONGATED ARTICLES WITH TRANSVERSE LOCKING MEANS

[72] Inventor: Peter McIlroy, II, Pittsburgh, Pa.
[73] Assignee: Robroy Industries, Verona, Pa.
[22] Filed: March 9, 1971
[21] Appl. No.: 122,352

[52] U.S. Cl............................................24/16 PB, 24/73 AP
[51] Int. Cl..........................................................B65d 63/00
[58] Field of Search..........................248/74 A, 74 B, 74 PB; 24/20 TT, 73 AP, 16 PB, 16 R

[56] References Cited

UNITED STATES PATENTS

| | | | |
|---|---|---|---|
| 823,591 | 6/1906 | Eager | 24/20 TT UX |
| 1,649,752 | 11/1927 | Stone | 24/20 TT UX |
| 1,721,864 | 7/1929 | Johnson | 24/20 TT UX |
| 3,266,109 | 8/1966 | Thomas | 24/20 TT |
| 3,429,985 | 2/1969 | Czigler | 24/16 R X |

Primary Examiner—Donald A. Griffin
Attorney—Stanley J. Price, Jr.

[57] ABSTRACT

A releasable clamp for securing elongated objects such as wires to a supporting structure that includes a substantially rigid base member, a substantially rigid inverted J-shaped locking member and a deformable tab member. The J-shaped locking member and deformable tab member extend upwardly from the end portions of the base member and have cooperating locking means thereon. The locking means includes an inwardly extending projection adjacent the free end portion of the J-shaped locking member and a plurality of transversely extending spaced locking projections on the outer surface of the deformable tab member. The inwardly extending projection of the J-shaped locking member is adapted to engage one of the spaced locking projections on the deformable tab member. The projections on the tab member have a generally triangular configuration in cross-section with a vertical locking shoulder and an adjacent inclined face. The transverse locking means includes a plurality of protuberances projecting upwardly from the tab member on opposite ends of each spaced projection on the tab member. The protuberances are positioned between the spaced locking projections so that the inwardly extending projection of the J-shaped locking member, when engaged to the vertical locking shoulder of a locking projection on the tab member, is restrained from transverse movement by the upwardly extending protuberances.

5 Claims, 4 Drawing Figures

PATENTED JUN 20 1972 3,670,369

INVENTOR.
PETER McILROY II
BY Stanley J Price
HIS ATTORNEY.

3,670,369

ADJUSTABLE CLAMP FOR ELONGATED ARTICLES WITH TRANSVERSE LOCKING MEANS

BACKGROUND OF THE INVENTION

1. Field of the Invention

This invention relates to adjustable clamps for releasably securing elongated articles to supporting structures and more particularly to adjustable clamps that include transverse locking means to prevent disengagement of the locking portions of the clamps.

2. Description of the Prior Art

U.S. Pat. No. 3,429,985, granted on Feb. 25, 1969 and assigned to the assignee of the present invention, discloses an adjustable clamp for securing elongated articles such as wires or the like, to a supporting structure. The adjustable clamp disclosed and claimed in the above patent has found substantial success in securing a plurality of wires of different diameter to the supporting structure. It has been found, however, that when the adjustable clamp is subjected to transverse forces, such as an inadvertent transverse movement of the J-shaped locking member, the J-shaped locking member will disengage from the vertical locking shoulder of the locking projection on the flexible tab.

SUMMARY OF THE INVENTION

This invention is an improvement on the adjustable clamp described and claimed in U.S. Pat. No. 3,429,985 and provides a transverse locking means to prevent inadvertent unlocking of the clamp by transverse movement of the J-shaped locking member.

It is an object of this invention to provide an improved releasable clamp that will not unlock when a transverse force is exerted on the locking members.

Another object of this invention is to provide an adjustable clamp with protuberances projecting upwardly adjacent opposite ends of each spaced projection on the tab member to prevent inadvertent unlocking when a transverse force is exerted on the locking members.

DESCRIPTION OF THE PREFERRED EMBODIMENTS

Figure 1:
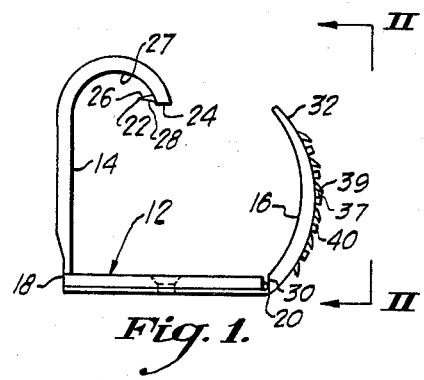
FIG. 1 is a view in front elevation of the adjustable clamp with the transverse locking means.
Figure 2:
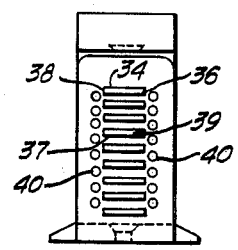
FIG. 2 is a view in side elevation taken along the line II—II of FIG. 1, illustrating the transverse locking means in elevation.

Referring to the drawings, there is illustrated an adjustable clamp generally designated by the numeral 10 with a rigid base member 12, a J-shaped locking member 14 and a deformable tab member 16. The rigid base member 12 is of a generally rectangular configuration and has end portions 18 and 20. The J-shaped locking member 14 is hingedly secured to the rigid base member 12 adjacent the end portion 18 and has a locking member projection 22 disposed on the inner surface 27 adjacent the end portion 24. The locking member projection 22 has a shoulder portion 26 and an inclined other surface 28. The J-shaped locking member 14 is relatively rigid and is hingedly secured to the base member 12 for movement toward and away from the tab member 16.

The tab member 16 is relatively flexible and has an end portion 30 hingedly secured to the base member 12 adjacent the end portion 20 for movement toward and away from the J-shaped locking member 14. The tab member 16 has an outer planar surface 32 with a plurality of outwardly extending locking projections 34 that extend transversely across the surface 32 in spaced parallel relation to each other and have transverse end portions 36 and 38. As is clearly illustrated in FIGS. 1 and 3, the locking projections 34 have a vertical shoulder portion 37 and an inclined other face 39.

A plurality of protuberances 40 project upwardly from the surface 32 of tab member 16 adjacent opposite end portions 36 and 38 of the locking projections 34. The protuberances 40 are positioned between adjacent locking projections 34 to serve as abutment means for the projection 22 on the J-shaped locking member 14. It should be understood although the protuberances 40 are illustrated as having a generally cylindrical shape and as separate protuberances positioned between the adjacent locking projections 34, a single protuberance extending longitudinally adjacent the locking projection end portions 36 and 38 could be utilized with equal facility.

Figure 3:
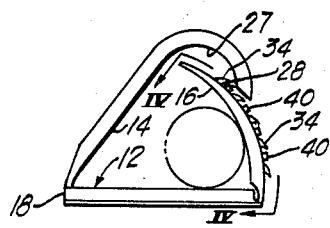
FIG. 3 is a view in front elevation illustrating the adjustable clamp in a locked position.
Figure 4:
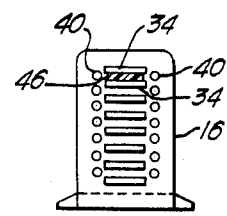
FIG. 4 is a view in side elevation and partially in section, taken along the line IV—IV of FIG. 3, illustrating the inwardly extending locking projection on the J-shaped locking member engaging the shoulder portion of one of the projections on the flexible tab member.

Referring particularly to FIG. 4, the projection 22 on the J-shaped locking member 14 is illustrated in section and has end portions 44 and 46. FIGS. 3 and 4 illustrate the manner in which the projection 22 on the J-shaped locking member 14 is positioned between adjacent locking projections 34 on the tab member 16 with the shoulder 26 of projection 22 engaging the shoulder 37 of the locking projections 34 on tab member 16. With this arrangement and as is described in detail in U.S. Pat. No. 3,429,985, the J-shaped locking member is hingedly moved into overlying relation with the outer surface 32 of tab member 16 to engage the projection 22 on J-shaped locking member 14 to one of the locking projections 34 on the tab member 16. The protuberances 40 on the tab outer surface 32 provide an abutment member adjacent the ends of the locking projections 34 to prevent transverse movement of the projection 22 on J-shaped locking member 14 relative to the locking projections 34 on the tab member 16. Thus, with this arrangement, the clamp cannot be inadvertently unlocked by lateral sliding of the J-shaped locking member 14 relative to tab member 16 due to application of transverse forces that are parallel to the longitudinal planes of the shoulder portions 26 and 37 of projections 22 and 34.

According to the provisions of the patent statutes, the principle, preferred construction and mode of operation of this invention have been explained and what is now considered to represent its best embodiment has been illustrated and described. However, it should be understood that, within the scope of the appended claims, the invention may be practiced otherwise than as specifically illustrated and described.

I claim:

1. In a releasable clamp for securing elongated articles to a supporting structure having,
   a substantially rigid base member,
   a substantially rigid generally inverted J-shaped locking member extending upwardly from said base member and terminating in an end portion,
   a deformable tab member extending upwardly from said base member,
   the improvement comprising,
   cooperating locking means disposed on said locking member and said deformable tab adapted to interengage and releasably lock said clamp,
   said interengaging locking means adjustable to secure articles of different sizes, and
   said locking means including a plurality of rigid protuberances on opposite sides of said locking means on said deformable tab member arranged to prevent lateral movement of said locking member relative to said deformable tab.

2. In a releasable clamp as set forth in claim 1 in which,
   said locking means includes a plurality of locking projections extending outwardly from said deformable tab member, said locking projections positioned in spaced parallel relation to each other and having a shoulder portion, an inclined surface and opposite end portions,
   said abutment means positioned adjacent to said locking projection end portions.

3. In a releasable clamp as set forth in claim 2 in which,
said locking means includes an inwardly extending locking member projection adjacent said free end portion of said J-shaped locking member, said inwardly extending locking member projection having a shoulder portion, an inclined surface and an opposite end portion,
said plurality of protuberances positioned on opposite sides of said locking projections spaced from each other a sufficient distance to permit said shoulder portion of said locking member projection on said J-shaped locking member to engage said shoulder portion of said locking projections on said deformable tab member and limit transverse movement of said locking member projection on said J-shaped locking member relative to said locking projection on said deformable tab upon engagement of said shoulder portions.

4. A releasable clamp member as set forth in claim 2 which includes,
a plurality of cylindrical protuberances positioned adjacent said deformable tab member locking projection end portions at a location between adjacent locking projections.

5. A releasable clamp member as set forth in claim 1 in which said abutment means includes,
a plurality of cylindrical protuberances projecting upwardly from the surface of said deformable tab member.

* * * * *